US009505425B2

(12) United States Patent
Mihara

(10) Patent No.: US 9,505,425 B2
(45) Date of Patent: Nov. 29, 2016

(54) POSITION ADJUSTMENT DEVICE OF STEERING WHEEL

(71) Applicant: NSK LTD., Tokyo (JP)

(72) Inventor: Shin Mihara, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/897,280

(22) PCT Filed: Sep. 26, 2014

(86) PCT No.: PCT/JP2014/075640
§ 371 (c)(1),
(2) Date: Dec. 10, 2015

(87) PCT Pub. No.: WO2015/046432
PCT Pub. Date: Apr. 2, 2015

(65) Prior Publication Data
US 2016/0121919 A1  May 5, 2016

(30) Foreign Application Priority Data

Sep. 30, 2013 (JP) ................. 2013-203333
May 15, 2014 (JP) ................. 2014-101052
Jul. 14, 2014 (JP) ................. 2014-144484

(51) Int. Cl.
  *B62D 1/184* (2006.01)
  *B62D 1/189* (2006.01)
  *B62D 1/187* (2006.01)
(52) U.S. Cl.
  CPC ............... *B62D 1/184* (2013.01); *B62D 1/187* (2013.01); *B62D 1/189* (2013.01)

(58) Field of Classification Search
  CPC ....... B62D 1/184; B62D 1/187; B62D 1/189
  See application file for complete search history.

(56) References Cited

U.S. PATENT DOCUMENTS

| 5,570,610 A | * | 11/1996 | Cymbal | ................ B62D 1/184 74/493 |
| 7,717,011 B2 | * | 5/2010 | Hirooka | ................ B62D 1/184 280/777 |
| 2004/0134302 A1 | * | 7/2004 | Ko | ........................ B62D 1/184 74/493 |
| 2006/0225530 A1 | | 10/2006 | Hirooka | |
| 2010/0219624 A1 | | 9/2010 | Matsuno | |

(Continued)

FOREIGN PATENT DOCUMENTS

| JP | 2001-322552 A | 11/2001 |
| JP | 2002-087286 A | 3/2002 |

(Continued)

OTHER PUBLICATIONS

Search Report dated Dec. 22, 2014, issued by the International Searching Authority in counterpart International Application No. PCT/JP2014/075640 (PCT/ISA/210).

(Continued)

*Primary Examiner* — Darlene Condra
(74) *Attorney, Agent, or Firm* — Sughrue Mion, PLLC

(57) ABSTRACT

In a position adjustment device of a steering wheel, a step forming surface is provided in a portion close to one axial end of an adjustment rod. A nut is threadedly fixed to one end portion of the adjustment rod in the axial direction. An adjustment lever is connected to a driving cam of a cam mechanism. The driving cam is sandwiched between the step forming surface and the nut.

6 Claims, 14 Drawing Sheets

(56) References Cited

U.S. PATENT DOCUMENTS

| | | | |
|---|---|---|---|
| 2010/0242665 A1 | 9/2010 | Nagamura et al. | |
| 2010/0294072 A1* | 11/2010 | Ishii | B62D 1/184 74/493 |
| 2011/0064538 A1* | 3/2011 | Oertle | B62D 1/184 411/360 |
| 2011/0156380 A1* | 6/2011 | Dietz | B60R 21/09 280/775 |
| 2011/0185839 A1* | 8/2011 | Inoue | B62D 1/195 74/493 |
| 2011/0259140 A1 | 10/2011 | Fevre | |
| 2012/0080874 A1* | 4/2012 | Narita | B62D 1/184 280/777 |
| 2012/0266715 A1* | 10/2012 | Okada | B62D 1/187 74/493 |
| 2012/0272778 A1* | 11/2012 | Okada | B62D 1/184 74/493 |
| 2012/0318093 A1 | 12/2012 | Huber | |
| 2013/0247708 A1* | 9/2013 | Hirooka | B62D 1/184 74/493 |

FOREIGN PATENT DOCUMENTS

| | | |
|---|---|---|
| JP | 2004-243957 A | 9/2004 |
| JP | 2005-231545 A | 9/2005 |
| JP | 2006-256585 A | 9/2006 |
| JP | 2010-201967 A | 9/2010 |

OTHER PUBLICATIONS

Written Opinion dated Dec. 22, 2014, issued by the International Searching Authority in counterpart International Application No. PCT/JP2014/075640 (PCT/ISA/237).

Communication dated May 25, 2016 issued by European Patent Office in counterpart European Patent Application No. 14846950.5.

* cited by examiner

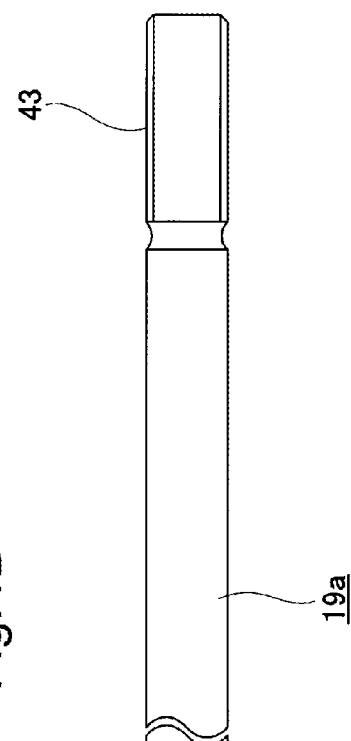
Fig.4B
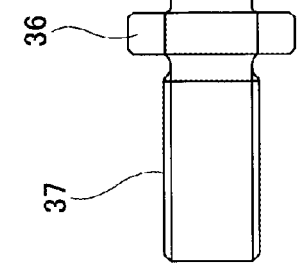
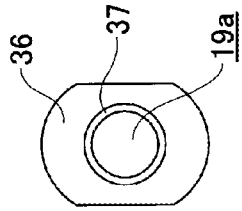
Fig.4A

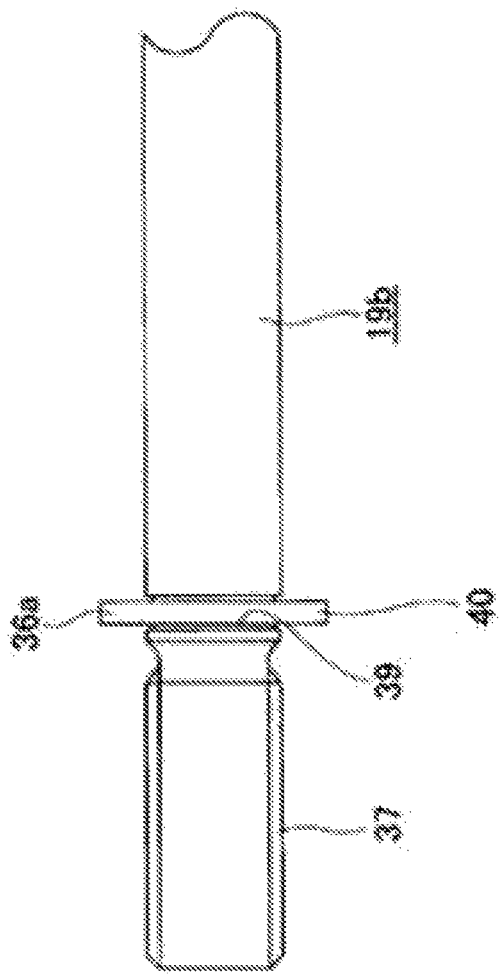
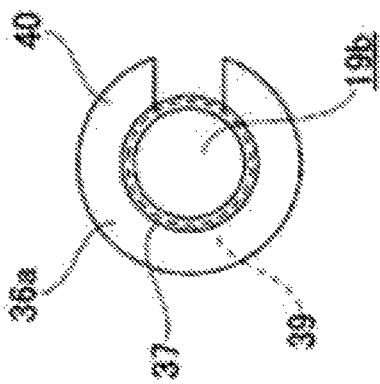
Fig.6B
Fig.6A

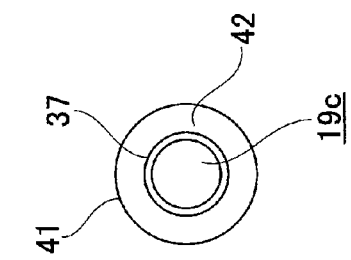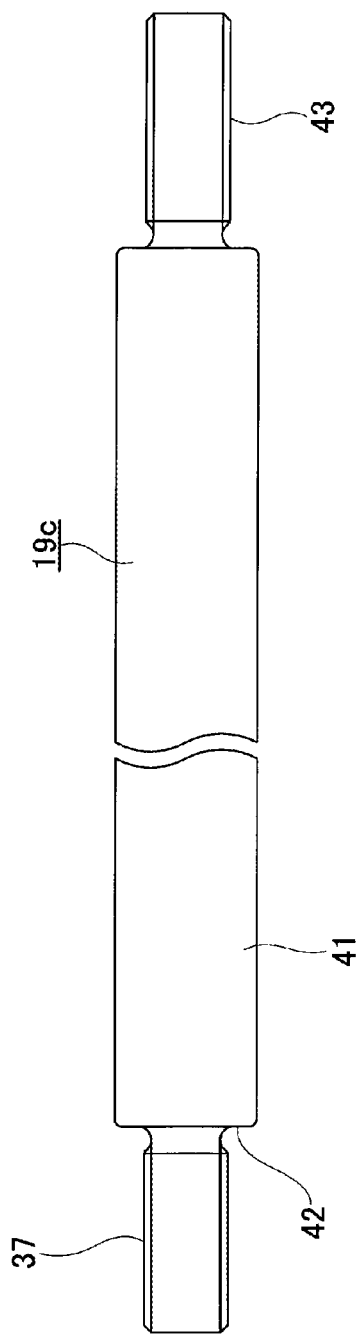

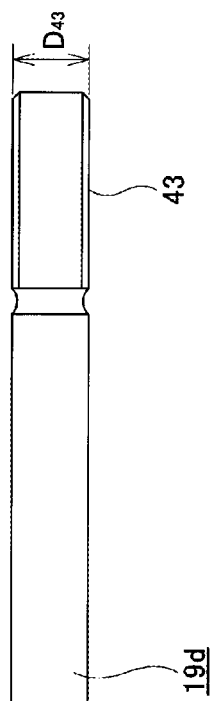
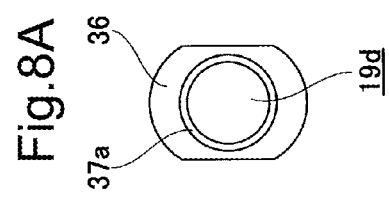

POSITION ADJUSTMENT DEVICE OF STEERING WHEEL

TECHNICAL FIELD

The present invention is related to a position adjustment device of a steering wheel which adjusts at least one of front and rear positions and top and bottom positions of the steering wheel in accordance with the physique and driving posture of a driver.

BACKGROUND ART

As illustrated in FIG. 9, a steering gear for a vehicle is configured to transfer the rotation of a steering wheel 1 to an input axis 3 of a steering gear unit 2, pushes and pulls tie rods 4, 4 which are respectively positioned on the right and left with the rotation of the input axis 3, and then causes a front wheel to have a certain steering angle. The steering wheel 1 is supported by and fixed to a rear end portion of a steering shaft 5. The steering shaft 5 is inserted into a cylindrical steering column 6 in the axial direction and is rotatably supported by the steering column 6. A front end portion of the steering shaft 5 is connected to a rear end portion of an intermediate shaft 8 via a universal joint 7. The front end portion of the intermediate shaft 8 is connected to the input axis 3 via another universal joint 9.

Along with this steering gear, in accordance with the physique and driving posture of a driver, a tilt mechanism which adjusts top and bottom positions of the steering wheel 1, and a telescopic mechanism which adjusts front and rear positions of the steering wheel 1 are widely known. In order to realize the tilt mechanism, the steering column 6 is pivotably supported by a pivot 11 which is provided in the width direction with respect to a vehicle body 10. Here, this width direction is the width direction of the vehicle body 10, and coincides with the lateral direction of the vehicle body 10. A displacement bracket is fixed to a rear portion of the steering column 6. The displacement bracket is displaceably supported with respect to a support bracket 12 which is supported by the vehicle body 10 in the vertical direction and the longitudinal direction. Here, this longitudinal direction is the longitudinal direction of the vehicle body 10. In order to realize the telescopic mechanism that can perform the displacement in the longitudinal direction, the steering column 6 is configured such that an outer column 13 and an inner column 14 are assembled together so as to be telescopically extendable. Further, the steering shaft 5 is configured such that an outer shaft 15 and an inner shaft 16 are assembled together so as to be torque-transferable and extendable through a spline engagement or the like. In an example of FIG. 9, an electric motor 17 is configured as an electric power steering apparatus which reduces power required for an operation of the steering wheel 1, as an auxiliary power unit.

The tilt mechanism and the telescopic mechanism are configured such that, except for a case of being operated electrically, a position of the steering wheel 1 is adjustable and the position after being adjusted can be fixed based on the operation of an adjustment lever. For example, in a first example of the related configuration as illustrated in FIG. 10 and FIG. 11, based on the rotation of an adjustment rod 19 by a adjustment lever 18, an axial dimension of a cam mechanism 20 which is provided at one end portion of the adjustment rod 19 in the axial direction (a left end portion in FIG. 11) is increased and decreased and a cam member 21 is pivotably displaced (for example, refer to Patent Document 1 and Patent Document 2). In the first example of the related configuration, a displacement bracket 22 which is fixed to an outer column 13a is disengaged from a support bracket 12a based on the increase and decrease of the cam mechanism 20. The inner column 14a slides or does not slide into the outer column 13a based on the pivot of the cam member 21.

The adjustment rod 19 is inserted into long holes 24, 24 in the vertical direction which are formed on supporting plate portions 23, 23 on the left and right side of the support bracket 12a, and long holes 25, 25 in the longitudinal direction which are formed in the displacement bracket 22, in the width direction. An outer shaft 15a and an inner shaft 16a configure a steering shaft 5a. In order to adjust the top and bottom positions or the front and rear positions of the steering wheel 1 which is supported by and fixed to the rear end portion of the steering shaft 5a (refer to FIG. 9), the adjustment lever 18 is pivoted in a predetermined direction (typically, in the lower direction), the axial dimension of the cam mechanism 20 is decreased and the cam member 21 is separated from the outer peripheral surface of the inner column 14a. The adjustment rod 19 enables the displacement along with the long holes 24, 24 in the vertical direction, and the rotation around the center axis of the adjustment rod 19. The cam mechanism 20 includes a driving cam 26 and a driven cam 27. The driving cam 26 is supported by and fixed to the one end portion of the adjustment rod 19 in the axial direction in a state where the relative rotation and axial displacement are inhibited (are disabled) with respect to the adjustment rod 19. The driven cam 27 is supported by an intermediate portion of the adjustment rod 19 in the axial direction so as to enable the relative rotation and axial displacement with respect to the adjustment rod 19. A convex portion 28 is provided on an inside surface of the driving cam 26 in the width direction (the right side surface in FIG. 11, and the lower side surface in FIG. 12A and FIG. 12B), and a concave portion 29 and a stepped portion 30 are provided on an outside surface of the driven cam 27 in the width direction (the left side surface in FIG. 11, and the upper side surface in FIG. 12A and FIG. 12B). In order to adjust the top and bottom positions and the front and rear positions of the steering wheel 1, as illustrated in FIG. 12A, by rotating the adjustment lever 18 in a predetermined direction (typically, the lower direction), the convex portion 28 of the driving cam 26 and the concave portion 29 of the driven cam 27 are engaged with each other, and the axial dimension of the cam mechanism 20 is decreased. In this state, the outer column 13a is possibly displaced corresponding to the degree that the adjustment rod 19 can be displaced in the long holes 24, 24 in the vertical direction and the long holes 25, 25 in the longitudinal direction. The steering shaft 5a is rotatably supported in the outer column 13a. That is, the position of the steering wheel 1, which is supported by and fixed to the rear end portion of the steering shaft 5a, can be adjusted. After the steering wheel 1 is moved to a desired position, the adjustment lever 18 is pivoted in a direction opposite to the above-described predetermined direction, and, as illustrated in FIG. 12B, the convex portion 28 of the driving cam 26 and the stepped portion 30 of the driven cam 27 are engaged with each other, and the axial dimension of the cam mechanism 20 is increased. Accordingly, a distance between the driven cam 27 and a nut 31 which is threadedly fixed to a male screw portion 43 provided at the other end portion of the adjustment rod 19 in the axial direction (the right end portion in FIG. 11) is reduced, and thus both of the supporting plate portions 23, 23 firmly press down an outer peripheral surface of the outer column 13a via the displacement bracket 22. At the same time, the cam member 21 presses down an outer peripheral surface of the inner column 14a onto an inner peripheral surface of the outer column 13a. As a result, it is possible to hold the steering wheel 1 at the adjusted position.

In the case of the above-described position adjustment device of the steering wheel, a fitted convex portion 32 which is provided on the outside surface of the driving cam 26 in the width direction is pressed into a fitting hole 33 which is provided in a base end portion of the adjustment lever 18, and thus the driving cam 26 and the adjustment lever 18 are combined without rattling. Further, the one end portion of the adjustment rod 19 in the axial direction is press-fitted (inserted and fixed) into a through hole 34 which is provided in the center portion of the driving cam 26. With such a configuration, the driving cam 26 is supported by the one end portion of the adjustment rod 19 in the axial direction in a state where the relative rotation and axial displacement are inhibited with respect to the adjustment rod 19, and the adjustment lever 18 is supported without rattling with respect to the adjustment rod 19.

The driving cam 26 may be made of sintered metal in order to prevent the abnormal wear or galling from being generated between the driving cam 26 and the driven cam 27. In a case where the driving cam 26 is made of the sintered metal, a fitting portion of the through hole 34 of the driving cam 26 and the adjustment rod 19 is required to have high shape accuracy and dimensional accuracy. As a result, there is a possibility of an increase of the manufacturing cost not only in the driving cam 26 and the adjustment rod 19 but also in the entire position adjustment device of the steering wheel.

On the other hand, FIG. 13 illustrates a second example of the related configuration relating to the position adjustment apparatus of the steering wheel. In the case of the second example in the related configuration, a sleeve 35 made of carbon steel, which is made of a synthetic resin such as a polyamide resin, a light alloy such as an aluminum-based alloy, or carbon steel such as S45C, is inserted into the through hole 34a of the driving cam 26a of the cam mechanism 20 (refer to FIG. 11), and then the adjustment rod 19 is inserted into (loosely fitted to) the internal diameter of the sleeve 35. Accordingly, the driving cam 26a is supported by the one end portion of the adjustment rod 19 in the axial direction so as to enable the relative rotation and axial displacement with respect to the adjustment rod 19. The driven cam (not shown) is supported by the intermediate portion of the adjustment rod 19 in the axial direction so as to be displaceable in the axial direction with respect to the adjustment rod 19, and inhibits the relative rotation thereof.

In the second example as described above, the engagement portion between the driving cam 26a and the sleeve 35 does not require particularly high shape accuracy and dimensional accuracy. For this reason, even in a case where the driving cam 26a is made of the sintered metal, the manufacturing cost of the position adjustment device of the steering wheel is not excessively increased. However, there is a possibility of the following problems. That is, there is an annular gap between the inner peripheral surface of the sleeve 35 and the outer peripheral surface of the adjustment rod 19. Even in this case, in a state where the axial dimension of the cam mechanism 20 (refer to FIG. 11) is increased, the driving cam 26a is firmly sandwiched between the driven cam and a nut 38 (refer to FIG. 11) which is threadedly fixed to the one end portion of the adjustment rod 19 in the axial direction, and thus the rattling of the driving cam 26a with respect to the adjustment rod 19 is suppressed. However, in a state where the adjustment lever 18 is rotated in a predetermined direction, and the axial dimension of the cam mechanism 20 is decreased, there is a possibility of the rattling of the driving cam 26a and the adjustment lever 18 with respect to the adjustment rod 19 (in the radial direction and the axial direction).

PRIOR ART DOCUMENT

Patent Document

Patent Document 1: JP-A-2001-322552
Patent Document 2: JP-A-2002-87286

SUMMARY OF THE INVENTION

Problem to be Solved

The present invention has been made in consideration of the above-described circumstance, and an object thereof is to realize a configuration of a position adjustment device of a steering wheel which is capable of preventing the rattling of an adjustment lever with respect to an adjustment rod while suppressing an increase in manufacturing cost, even in a case where a driving cam is made of, for example, hard sintered metal or the like.

Means for Solving the Problem

According to an aspect of the present invention, there is provided a position adjustment device of a steering wheel including a steering column, a displacement bracket, a steering shaft, a support bracket, an adjustment rod, a nut, a cam mechanism, and an adjustment lever. The steering column is formed in a cylindrical shape, and is supported by a vehicle body. The displacement bracket is fixedly provided in a portion of the steering column. For example, the displacement bracket is provided on an upper side or a lower side of the steering column so as to be fixed to a portion which is an axial intermediate portion of the steering column and does not interfere with a steering shaft. The displacement bracket is provided with a through hole on a column side so as to pass through the displacement bracket in a width direction. The steering shaft is rotatably supported inside the steering column. The steering shaft includes a rear end portion which protrudes from an opening of a rear end of the steering column so as to support and fix the steering wheel. The support bracket includes left and right supporting plate portions, and is supported by the vehicle body in a state where the displacement bracket is interposed between the supporting plate portions from both sides in the width direction. Through holes on the vehicle body are provided in the left and right supporting plate portions so as to correspond to each other. The adjustment rod is inserted into the through holes on the vehicle body side and the through hole on the column side in the width direction. The nut is threadedly fixed to one end portion of the adjustment rod in the axial direction. The cam mechanism includes a driving cam and a driven cam, and is configured to increase and decrease an axial dimension thereof in accordance with a rotation of the driving cam with respect to the driven cam so as to increase and decrease the distance between the left and right supporting plate portions. The adjustment lever is connected to the driving cam. The driving cam is supported by the portion close to one axial end of the adjustment rod such that an axial displacement of the driving cam is inhibited, and is rotatable based on an operation of the adjustment lever. The driven cam is engaged in a non-rotatable manner with the through hole on the vehicle body which is provided on one of the left and right supporting plate portions, and is supported by an intermediate portion of the adjustment rod in the axial direction so as to be displaceable in the axial direction. At least one of the through holes on the vehicle body side and the through hole on the column side is configured as a long hole which is long in the direction in which a position of the steering wheel is adjustable.

The portion close to one axial end of the adjustment rod is provided with a step forming surface (for example, a surface on a virtual plane orthogonal to a center axis of the adjustment rod) which faces one side of the axial direction. The driving cam is sandwiched between the step forming surface and the nut.

The driving cam may be made of a sintered metal.

An outer peripheral surface of the portion close to one axial end of the adjustment rod may be provided with a flange portion, and one surface of the flange portion in the axial direction may be configured as the step forming surface. The adjustment rod may include a locking groove which is formed on the outer peripheral surface of the portion close to one axial end of the adjustment rod, and the flange portion may be provided as a snap ring (for example, a segmental annular snap ring) which is locked in the locking groove. The flange portion may have a non-circular shape. An external diameter of the one end portion of the adjustment rod in the axial direction may be greater than an external diameter the other end portion of the adjustment rod in the axial direction.

Effects of the Invention

According to the above-described position adjustment device of the steering wheel, a configuration which prevents the rattling of the adjustment lever with respect to the adjustment rod while suppressing an increase in manufacturing cost can be realized even in a case where the driving cam of the cam mechanism is made of, for example, a sintered metal. That is, since the driving cam is sandwiched between the step forming surface which is provided in the adjustment rod and the nut which is threadedly fixed to one end portion of the adjustment rod in the axial direction, it is possible to prevent the rattling of the adjustment lever with respect to the adjustment rod even in a state where the adjustment lever is rotated in a predetermined direction (the axial dimension of the cam mechanism is decreased). Therefore, it is not necessary to press the adjustment rod into the driving cam, and thus a fitting portion between the driving cam and the adjustment rod does not need to have excessively high shape accuracy and dimensional accuracy. Accordingly, it is possible to suppress the excessive increase in the manufacturing cost of the entire position adjustment device of the steering wheel.

BRIEF DESCRIPTION OF DRAWINGS

FIGS. 4A and 4B illustrate an end elevation view and a side view of the adjustment rod.

FIGS. 6A and 6B illustrate an end elevation view and a side view of another example of the adjustment rod.

FIGS. 7A and 7B illustrate an end elevation view and a side view of still another example of the adjustment rod.

FIGS. 8A and 8B illustrate a cross-sectional view and a side view of still another example of the adjustment rod.

DETAILED DESCRIPTION OF EMBODIMENTS

Hereinafter, embodiments of the present invention will be described in detail with reference to the drawings. Including the configuration illustrated in FIGS. 10 to 13, the description relating to the same parts as that of the related configuration will be omitted or simplified. FIGS. 1 to 5 illustrate a configuration relating to an embodiment of the present invention.

In the example, a driving cam 26b of a cam mechanism 20a is made of a sintered metal. The driving cam 26b may not be made of a sintered metal, but in the case of being made of a sintered metal, it is possible to prevent generation of the abnormal wear or galling as described above. A sintered metal may be, for example, alumina ceramics ($Al_2O_3$), silicon nitride ceramics ($Si_3N_4$), silicon carbide (SiC), or zirconia ceramics ($ZrO_2$). From the viewpoint of weight reduction, the driving cam 26b is preferably made of ceramics. From the viewpoint of cost efficiency, the driving cam 26b is also preferably made of ceramics, and particularly, is preferably made of alumina ceramics. A method of manufacturing the driving cam 26b of ceramics is not particularly limited. For example, it is possible to properly combine such a process with a process of sintering or a process of polishing after the sintering. The driving cam 26b which is made of ceramics may be made by executing a cutting process.

Figure 1:
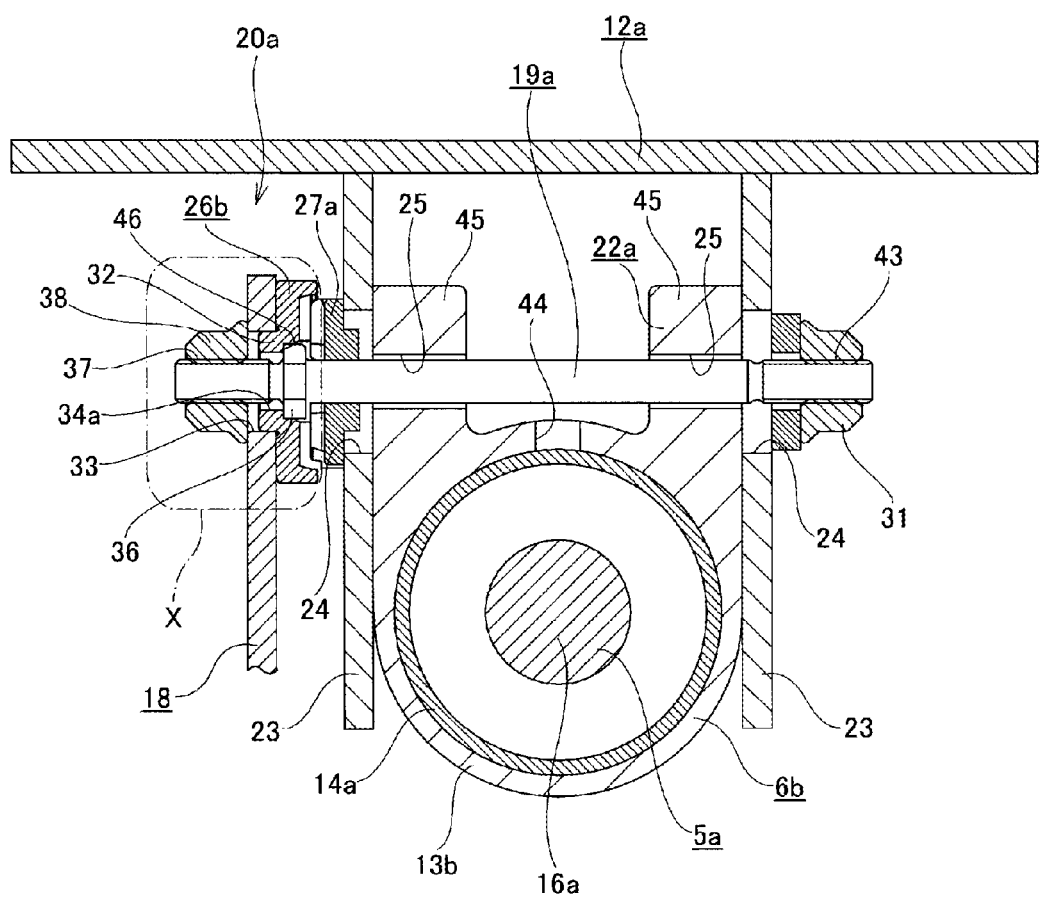
FIG. 1 is a cross-sectional view of a configuration according to an embodiment of the present invention.
Figure 2:
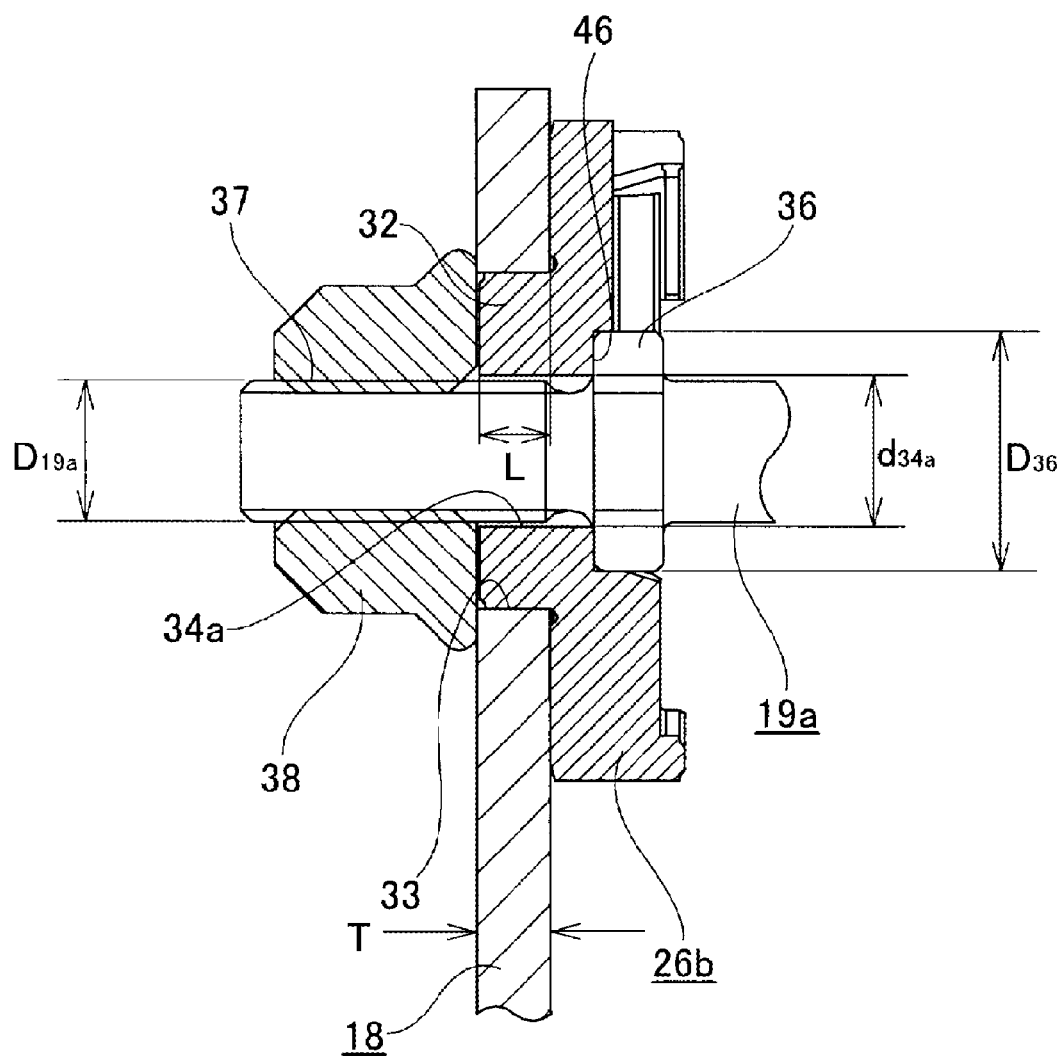
FIG. 2 is an enlarged view of an X portion in FIG. 1.
Figure 3A:
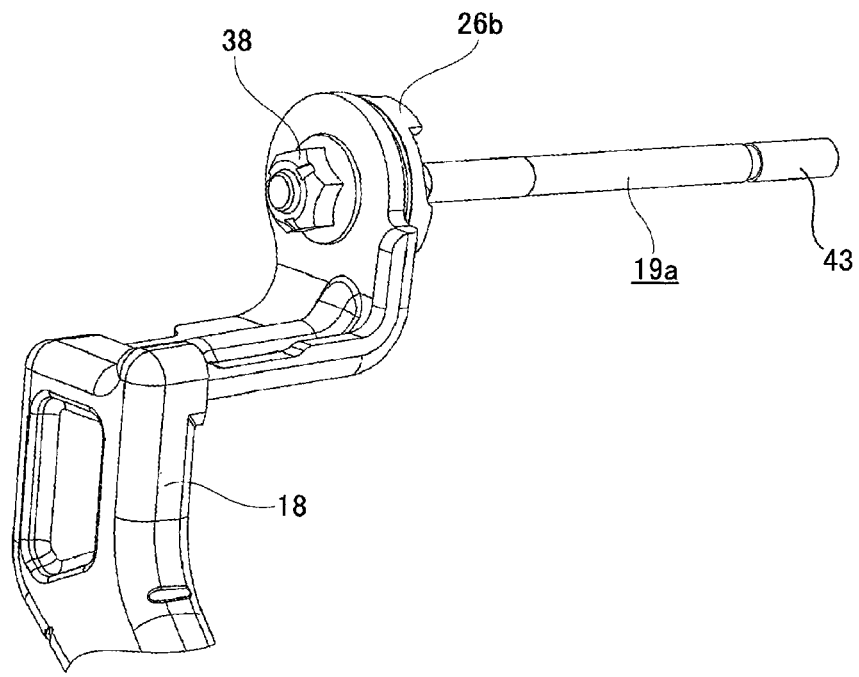
FIG. 3A is a perspective view of an adjustment lever, an adjustment rod, and a driving cam.
Figure 3B:
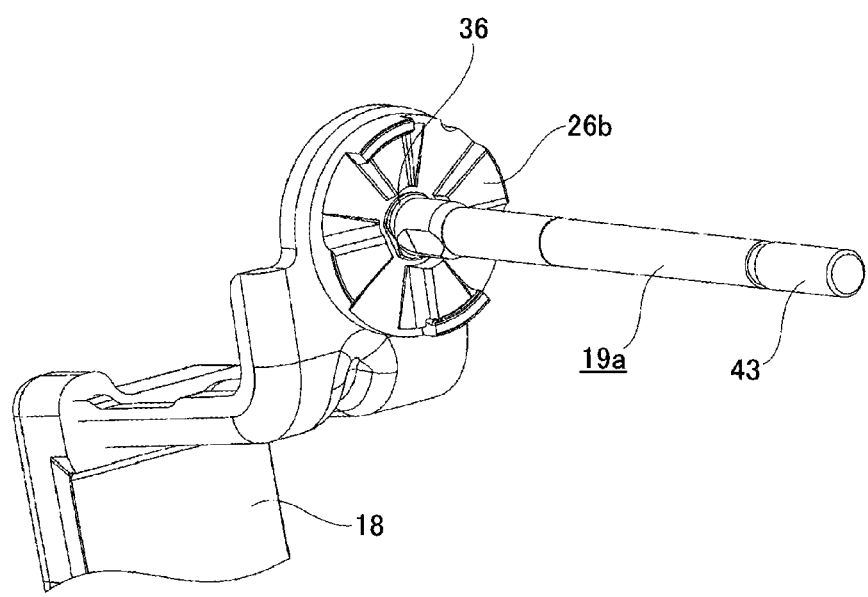
FIG. 3B is a perspective view of the adjustment rod seen from the opposite side in the axial direction in FIG. 3A.

The driving cam 26b includes a fitted convex portion 32 which is provided on the outside surface in the width direction (the left side surface in FIGS. 1 and 2). The fitted convex portion 32 is pressed into a fitting hole 33 which is provided in a base end portion of an adjustment lever 18. In an outer peripheral surface of the portion close to one axial end of an adjustment rod 19a (the left side in FIG. 1), a flange portion 36 such as an outward flange is integrated with the adjustment rod 19a. The adjustment rod 19a is made by pressing, for example, a rod-shaped metal material, or cutting a portion except for the flange portion 36. The driving cam 26b further includes a through hole 34a which is provided in the center portion of the driving cam 26b, and a concave portion 46 which is formed in a peripheral portion of the through hole 34a in the inside surface of the driving cam 26b in the width direction. In a state where the one end portion of the adjustment rod 19a in the axial direction is inserted into the through hole 34a of the driving cam 26b, the flange portion 36 is engaged with (abutted on) a bottom surface of the concave portion 46 of the driving cam 26b. The flange portion 36 and the concave portion 46 of the driving cam 26b may be engaged with each other by gap engaging. A circumscribed circle diameter $D_{36}$ of the flange portion 36 is sufficiently greater than an internal diameter $d_{34a}$ of the through hole 34a of the driving cam 26b ($D_{36}>d_{34a}$). An external diameter $D_{19a}$ of the one end portion of the adjustment rod 19a in the axial direction is a little smaller than the internal diameter $d_{34a}$ of the through hole 34a ($D_{19a}<d_{34a}$). A male screw portion 37 is provided in the one end portion of the adjustment rod 19a in the axial direction. A nut 38 is threadedly engaged with the male screw portion 37. By tightening the nut 38, the driving cam 26b is firmly sandwiched between the inside surface of the nut 38 in the width direction (bearing surface, and the right side surface in FIGS. 1 and 2) and one surface of the flange portion 36 in the axial direction (an example of the step forming surface) from both sides in the width direction. With such a configuration, the driving cam 26b is supported by the one end portion of the adjustment rod 19a in the axial direction in a state where the relative rotation and axial displacement are inhibited with respect to the adjustment rod 19a. In the example, the driving cam 26b is sandwiched between the nut 38 and the flange portion 36 via the adjustment lever 18 (the periphery of the fitting hole 33). That is, the adjustment lever 18 is sandwiched between the nut 38 and the driving cam 26b. The fitted convex portion 32 of the driving cam 26b does not need to abut on the nut 38. In this case, a projection length L of the fitted convex portion 32 from the outside surface in the width direction (a surface on which the adjustment lever 18 abuts) of the driving cam 26b in the periphery of the fitted convex portion 32 is shorter than a board thickness T of the adjustment lever 18 (L<T).

The driven cam 27a of the cam mechanism 20a is engaged with a long hole 24 in the vertical direction (an example of the through hole in the vehicle body side) which is provided in one of the supporting plate portions 23, 23 in the vertical direction, and is supported by an intermediate portion of the adjustment rod 19a in the axial direction so as to be displaceable in the axial direction. For example, a protrusion portion of approximately rectangular shape is provided on the inside surface in the width direction of the driven cam 27a, and is engaged with the long holes 24 in the vertical direction. Accordingly, the driven cam 27a is non-rotatable with respect to the supporting plate portions 23, and is displaceable along with the long holes 24 in the vertical direction.

Figure 5A:
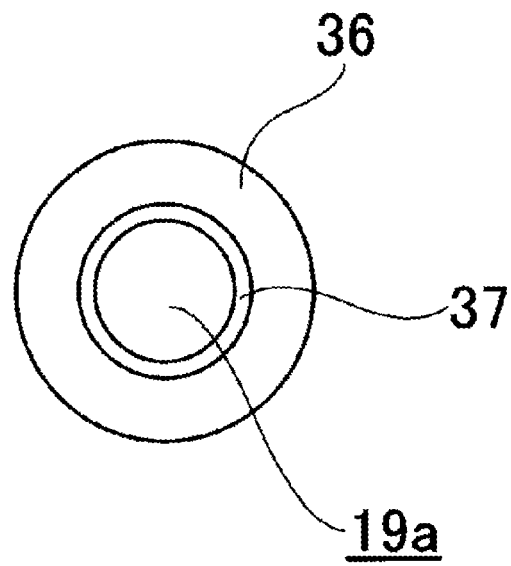
FIG. 5A is an end elevation view of the adjustment rod which illustrates another example of a flange portion.
Figure 5B:
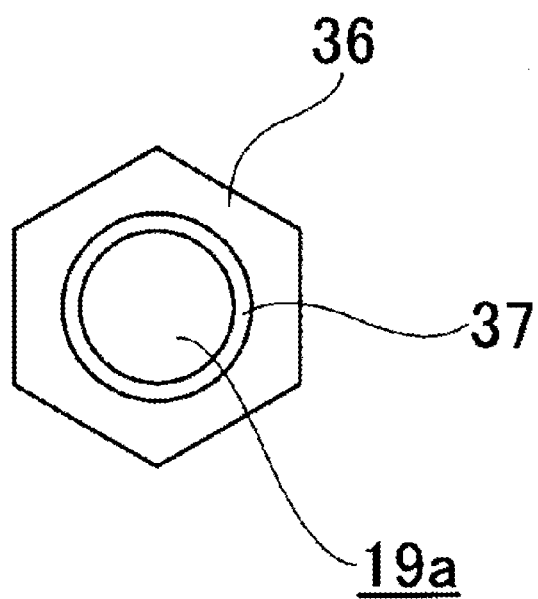
FIG. 5B is an end elevation view of the adjustment rod, which illustrates still another example of the flange portion.
Figure 5C:
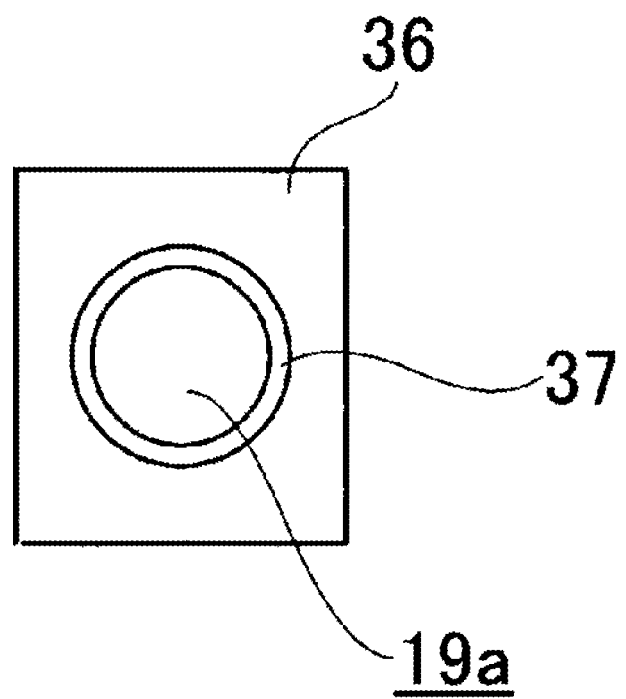
FIG. 5C is an end elevation view of the adjustment rod, which illustrates still another example of the flange portion.

The flange portion 36 seen from the axial direction of the adjustment rod 19a is formed into an oval body shape as illustrated in FIG. 4A. However, the shape of the flange portion 36 seen from the axial direction of the adjustment rod 19a is not limited to the oval body shape. For example, the shape of the flange portion 36 may be formed into a circle as illustrated in FIG. 5A, a hexagon as illustrated in FIG. 5B, or a rectangle as illustrated in FIG. 5C. In regards to the concave portion 46 formed on the inside surface in the width direction of the driving cam 26b, it is possible to adopt various shapes which match with the flange portion 36. For example, if both of the flange portion 36 and the concave portion 46 are formed into a non-circular shape, by engaging the flange portion 36 and the concave portion 46 with each other, it is possible to make the driving cam 26b relatively non-rotatable with respect to the adjustment rod 19a. Only the flange portion 36 may be formed into the non-circular shape.

Figure 9:
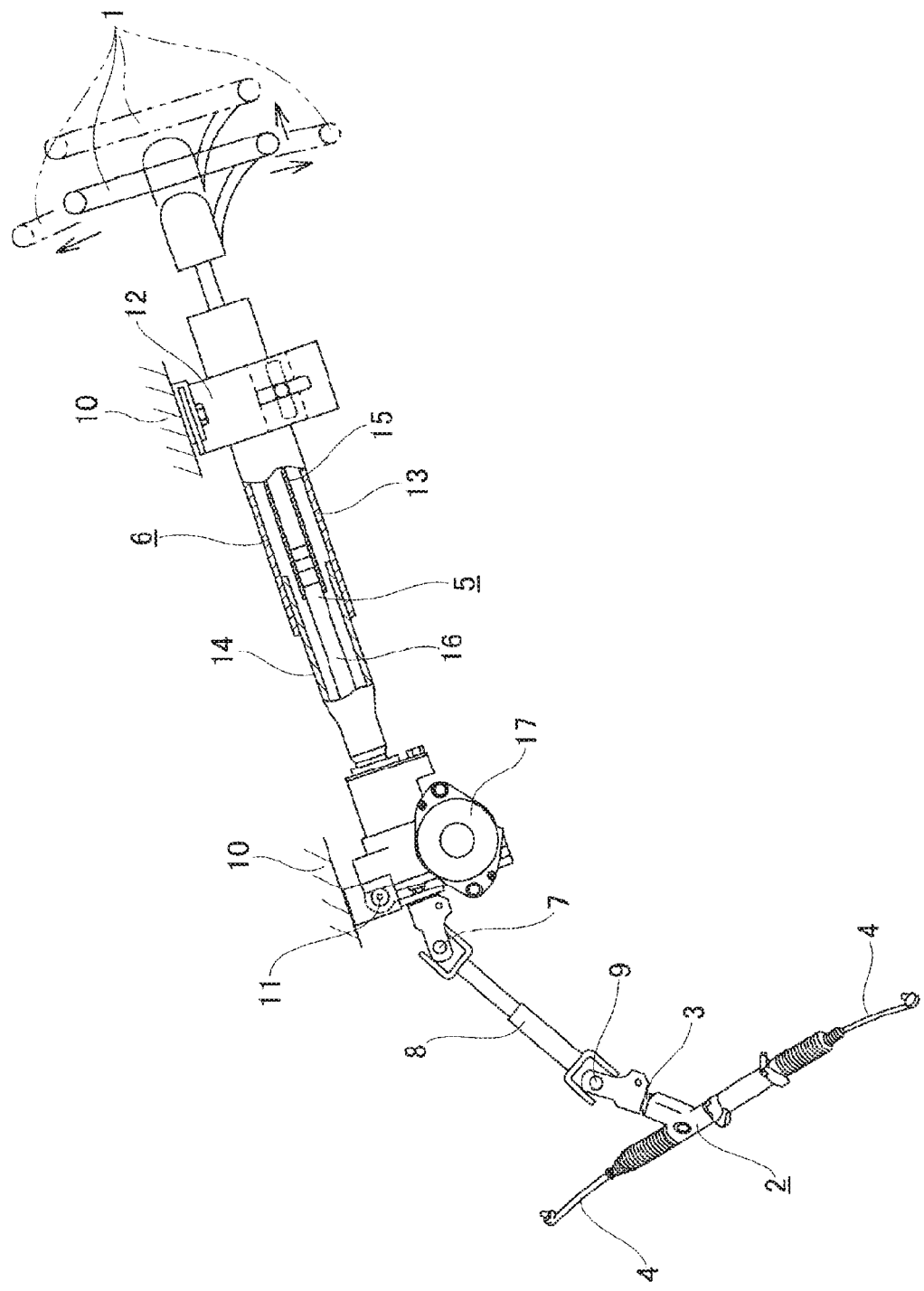
FIG. 9 is a side view in which a steering apparatus including a telescopic mechanism and a tilt mechanism is partially cut.
Figure 10:
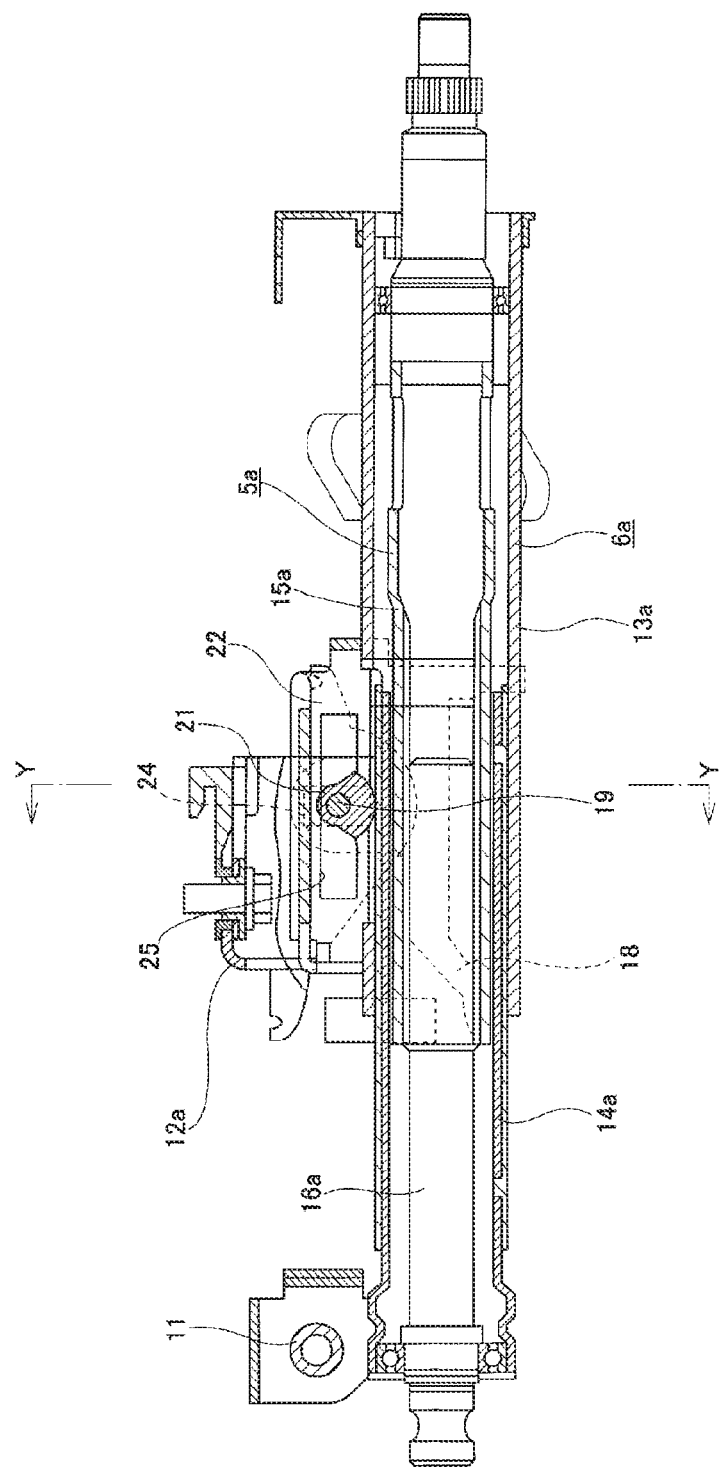
FIG. 10 is a longitudinal sectional side view illustrating a first example of the related configuration.
Figure 11:
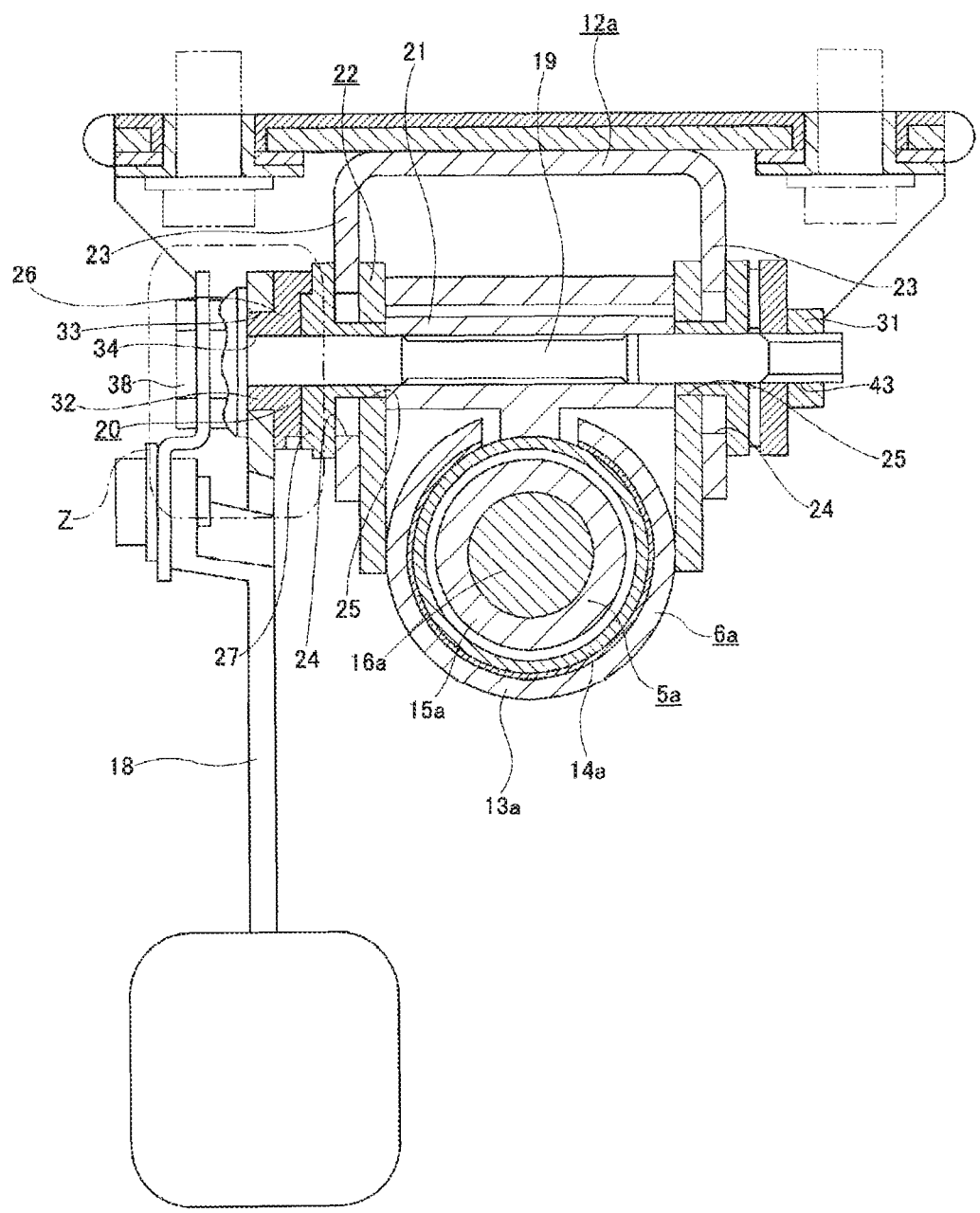
FIG. 11 is an enlarged cross-sectional view taken along line Y-Y in FIG. 10.
Figure 12A:
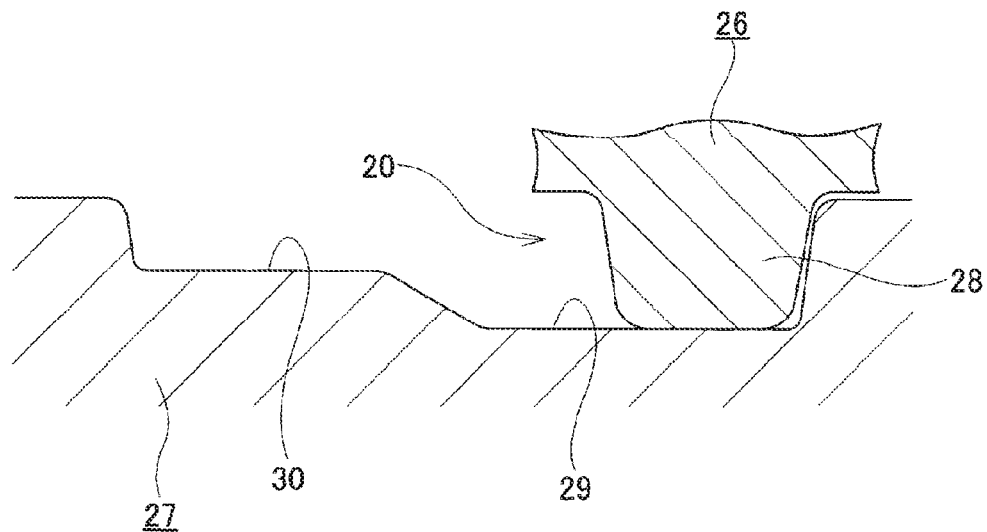
FIG. 12A is a schematic view illustrating an operation of a cam mechanism.
Figure 12B:
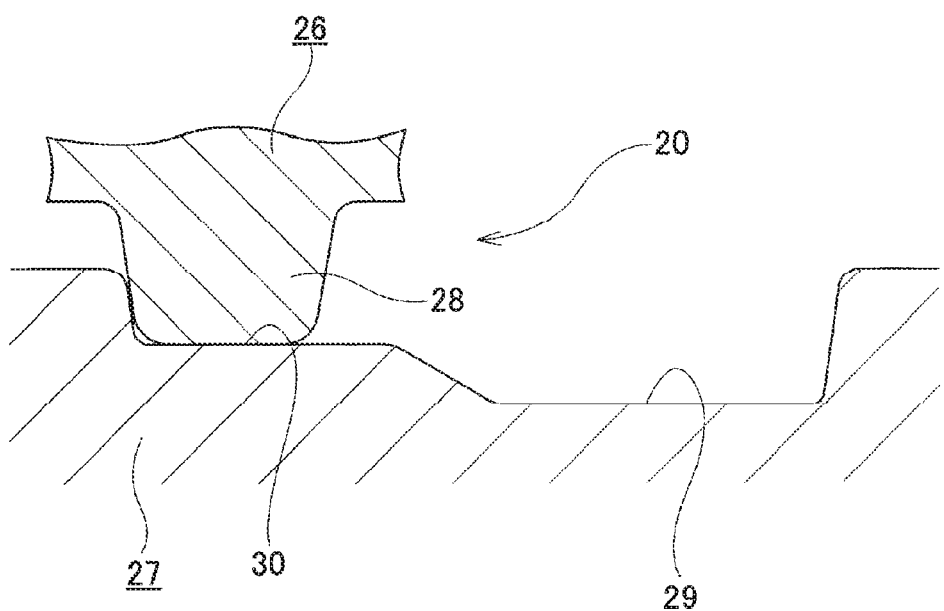
FIG. 12B is another schematic view illustrating the operation of the cam mechanism.
Figure 13:
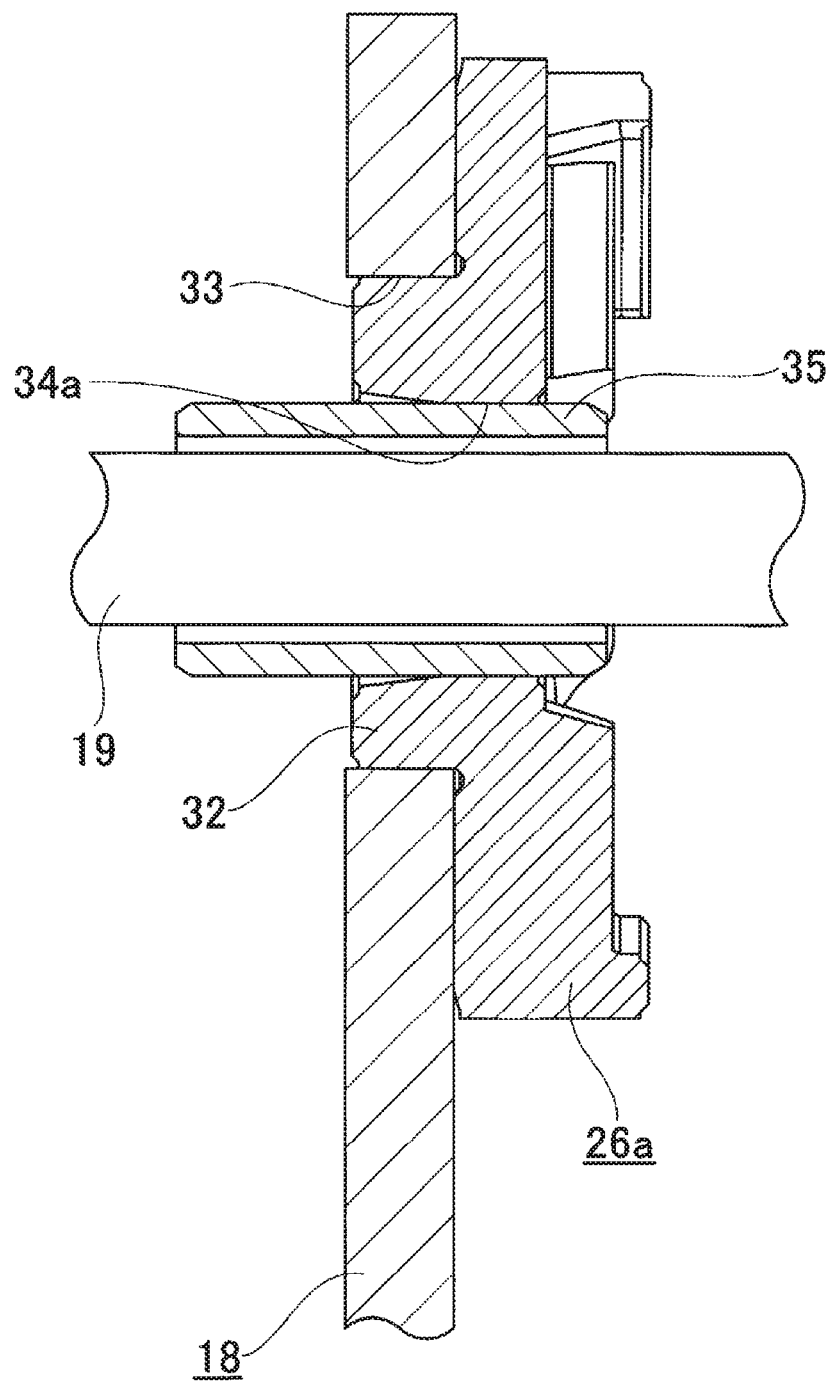
FIG. 13 is a diagram which illustrates a second example of the related configuration and corresponds to an enlarged view of Z portion in FIG. 11.

In order to make an internal diameter of a front end portion of an outer column 13b configuring a steering column 6b elastically increase and decrease, an axial slit 44 which is long in the axial direction is formed from the front end portion to the around center portion of the outer column 13b, and a pair of sandwiched portions 45, 45 which configure the displacement bracket 22a are formed at a position in which the center portion of the axial slit 44 is interposed between both sides in the width direction. In order to adjust the position of the steering wheel 1 (refer to FIG. 9), the adjustment lever 18 is pivoted (rotationally moved) in a predetermined direction, the axial dimension of the cam mechanism 20a is decreased, and then the distance between inside surfaces in the width direction of the driven cam 27a of the cam mechanism 20a and the nut 31 which is threadedly fixed to the other end portion of the adjustment rod 19a in the axial direction is increased. In this state, a surface pressure caused by an abutting portion arranged between the inside surface in the width direction of the supporting plate portions 23, 23 of the support bracket 12a and the outside surface in the width direction of the sandwiched portions 45, 45 is lowered or eliminated. At the same time, the internal diameter of the front end portion of the outer column 13b elastically expands, and a surface pressure caused by an abutting portion arranged between the inner peripheral surface of the front end portion of the outer column 13b and the outer peripheral surface of the rear end portion of the inner column 14a is lowered or eliminated. In this state, the front and rear positions and the top and bottom positions in the steering wheel 1 can be adjusted corresponding to the degree that the adjustment rod 19a can be displaced in the long holes 24, 24 in the vertical direction (an example of the through holes on the vehicle body side) which are provided in supporting plate portions 23, 23, and long holes 25, 25 in the longitudinal direction (an example of the through hole on the column side) which are provided in sandwiched plate portions 45, 45. In addition, in a state where the steering wheel 1 is moved to a desired position, the adjustment lever 18 is pivoted in a direction opposite to the above-described predetermined direction, the axial dimension of the cam mechanism 20a is increased, and then the distance between the inside surfaces of the driven cam 27a and the nut 31 are decreased. As a result, the supporting plate portions 23, 23 firmly press down the sandwiched plate portions 45, 45, and thereby the displacement of the steering column 6b in the vertical direction is inhibited. At the same time, the internal diameter of the front end portion of the outer column 13b is decreased, the fitting strength between the front end portion of the outer column 13b with the rear end portion of the inner column 14a is made to be high, and thereby the displacement of the outer column 13b in the longitudinal direction is inhibited with respect to the inner column 14a. As a result, it is possible to hold the steering wheel 1 at the adjusted top and bottom positions and the adjusted front and rear positions. In the configuration in which the front and rear positions of the steering wheel (the front and rear positions of the outer column with respect to the inner column) are held at the adjusted positions, as illustrated in the examples of FIGS. 10 and 11, the outer peripheral surface of the inner column 14a may be firmly pressed down by the cam member 21.

According to the above-described position adjustment device of the steering wheel, a configuration which prevents the rattling of the adjustment lever 18 with respect to the adjustment rod 19a while suppressing an increase in manufacturing cost can be realized even in a case where the driving cam 26b is made of a sintered metal. That is, since the driving cam 26b is sandwiched between the flange portion 36 which is provided in the adjustment rod 19a and the nut 38 which is threadedly fixed to the one end portion of the adjustment rod 19a in the axial direction, it is possible to prevent the rattling of the adjustment lever 18 which is connected to the driving cam 26b with respect to the adjustment rod 19a even in a case where the adjustment lever 18 is rotated in a predetermined direction so as to decrease the dimension of the cam mechanism 20a in the width direction. In the example, in order to prevent the rattling, as in the configuration illustrated in FIG. 11, there is no need to press the adjustment rod 19 into the through hole 34 of the driving cam 26. Accordingly, the driving cam 26b and the adjustment rod 19a are not required to have excessively high shape accuracy and dimensional accuracy. Therefore, it is possible to suppress the excessive increase in the manufacturing cost of the entire position adjustment device of the steering wheel.

FIGS. 6A and 6B illustrate another example of the adjustment rod. An adjustment rod 19b of the example includes a locking groove 39 which is formed over the outer peripheral surface of the portion close to the one axial end of the adjustment rod 19b. A segmental annular snap ring 40 is locked in the locking groove 39, and therefore, the flange portion 36a is provided in the portion close to the one axial end of the adjustment rod 19b. In the example, unlike in the first example, it is possible to reduce am amount of work necessary for providing the flange portion 36a in the adjustment rod 19b. The flange portion 36a may be made of different material from that of the adjustment rod 19b. A position and a size (a width dimension in the circumferential direction) of a discontinuous portion which is provided in a part of the snap ring 40 in the circumferential direction are not limited to the configuration illustrated in the drawings. The discontinuous portion may not be provided in a part of the snap ring 40. Since the configuration and functions of other parts are the same in the first example as described above, the illustration of drawings and description of repeated parts will be omitted.

FIGS. 7A and 7B illustrate still another example of the adjustment rod. An axial intermediate portion of an adjustment rod 19c of the example is configured as a large diameter portion 41 of which the external diameter is greater than both ends in the axial direction. A step forming surface 42 which faces one surface in the axial direction is provided between the large diameter portion 41 and the male screw portion 37 (the portion close to one axial end) which is provided in the one end portion of the adjustment rod 19c in the axial direction. The driving cam 26b is sandwiched between the step forming surface 42 and the nut 38 which is threadedly engaged with the male screw portion 37. In the example, it is possible to reduce the amount of work necessary for providing the step forming surface 42 compared with the work amount in a case where the flange portion 36 according to the above-described first example is formed through a cutting process. Since the configuration and functions of other parts are the same in the first example of embodiments as described above, the illustration of drawings and description of repeated parts will be omitted.

FIGS. 8A and 8B illustrate still another example of the adjustment rod. In the example, an external diameter $D_{37a}$ of the one end portion of an adjustment rod 19d in the axial direction is greater than an external diameter $D_{43}$ of the other end portion of the adjustment rod 19d in the axial direction. For example, the external diameter $D_{37a}$ of the male screw portion 37a which is provided in the one end portion of the adjustment rod 19d in the axial direction is greater than the external diameter $D_{43}$ of the male screw portion 43 which is provided in the other end portion in the axial direction. In a case where the driving cam 26b is sandwiched between the flange portion 36 of the adjustment rod 19a and the nut 38 which is threadedly fixed to the one end portion of the adjustment rod 19a in the axial direction, an axial load occurs in the male screw portion 37a by fastening the nut 38. In addition, even when maintaining the position of the steering wheel 1 by adjusting the position of the steering wheel 1, and increasing the dimension of the cam mechanism 20a in the width direction, an axial load still occurs on the male screw portion 37a. That is, a load greater than that of the male screw portion 43 occurs in the male screw portion 37a. As described in the example, durability of the male screw portion 37a is improved by setting the external diameter $D_{37a}$ of the male screw portion 37a to be greater than the external diameter $D_{43}$ of the male screw portion 43. The external diameter of the flange portion 36 may be set to be greater in response to the external diameter of the male screw portion 37a. In that case, a contact area between a bottom surface of the concave portion 46 of the driving cam 26b and the flange portion 36 becomes greater, and when the nut 38 is tightened by being threadedly engaged with the male screw portion 37, the load applied on the driving cam 26b per unit of area is decreased and thereby improves the durability of the driving cam 26b. Since the configuration and functions of other parts are the same in the first example as described above, the illustration of drawings and description of repeated parts will be omitted.

INDUSTRIAL APPLICABILITY

The respective examples describe the position adjustment device of the steering wheel, which includes the tilt mechanism for adjusting the top and bottom positions of the steering wheel in addition to the telescopic mechanism for adjusting the front and rear positions of the steering wheel. Meanwhile, the present invention is applicable to a position adjustment device of a steering wheel which includes only one of the telescopic mechanism and the tilt mechanism.

This application is based upon the prior Japanese Patent Application No. 2013-203333 filed on Sep. 30, 2013, Japanese Patent Application No. 2014-101052 filed on May 15, 2014, and Japanese Patent Application No. 2014-144484 filed on Jul. 14, 2014, the entire contents of which are incorporated herein by reference.

DESCRIPTION OF REFERENCE NUMERALS 1 steering wheel
2 steering gear unit
3 input axis
4 tie rod
5, 5a steering shaft
6, 6a, 6b steering column
7 universal joint
8 intermediate shaft
9 universal joint
10 vehicle body
11 pivot
12, 12a support bracket
13, 13a, 13b outer column
14, 14a inner column 15, 15a outer shaft
16, 16a inner shaft
17 electric motor
18 adjustment lever
19, 19a to 19d adjustment rod
20, 20a cam mechanism
21 cam member
22 displacement bracket
23 supporting plate portion
24 long hole in vertical direction
25 long hole in the longitudinal direction
26, 26a, 26b driving cam
27, 27a driven cam
28 convex portion
29 concave portion
30 stepped portion
31 nut
32 fitted convex portion
33 fitting hole
34, 34a through hole
35 sleeve
36, 36a flange portion (flange portion including step forming surface)
37, 37a male screw portion
38 nut
39 locking groove
40 snap ring
41 large diameter portion
42 step forming surface
43 male screw portion
44 axial slit
45 sandwiched portion
46 concave portion

The invention claimed is:

1. A position adjustment device of a steering wheel, the position adjustment device comprising:
a cylindrical steering column;
a displacement bracket which is fixedly provided in a portion of the steering column, and is formed with a through hole on a column side so as to pass through the displacement bracket in a width direction;
a steering shaft which is rotatably supported inside the steering column, and includes a rear end portion which protrudes from a rear end opening of the steering column so as to support and fix the steering wheel;
a support bracket which is supported by a vehicle body, includes left and right supporting plate portions which interpose the displacement bracket from both sides in the width direction, and is formed with through holes on a vehicle body side in portions of the supporting plate portions corresponding to each other;
an adjustment rod which is inserted into the through holes on the vehicle body side and the through hole on the column side in the width direction;
a nut which is threadedly fixed to one end portion of the adjustment rod in an axial direction thereof;
a cam mechanism which includes a driving cam and a driven cam, and is configured to increase and decrease an axial dimension thereof in accordance with a rotation of the driving cam with respect to the driven cam so as to increase and decrease a distance between the left and right supporting plate portions; and
an adjustment lever which is connected to the driving cam,
wherein the driving cam is supported by a portion close to one axial end of the adjustment rod such that an axial displacement of the driving cam is inhibited, and is rotatable based on an operation of the adjustment lever,
wherein the driven cam is engaged with one of the through holes on the vehicle body side which is provided on one of the left and right supporting plate portions, and is supported by an intermediate portion of the adjustment rod in the axial direction so as to be displaceable in the axial direction,
wherein at least one of the through holes on the vehicle body side and the through hole on the column side is configured as a long hole which is long in a direction in which a position of the steering wheel is adjustable,
wherein the portion close to one axial end of the adjustment rod is provided with a step forming surface which faces one side of the axial direction, and
wherein the driving cam is sandwiched between the step forming surface and the nut.

2. The position adjustment device of the steering wheel according to claim 1,
wherein the driving cam is made of a sintered metal.

3. The position adjustment device of the steering wheel according to claim 1,
wherein an outer peripheral surface of the portion close to one axial end of the adjustment rod is provided with a flange portion, and one surface of the flange portion in the axial direction is configured as the step forming surface.

4. The position adjustment device of the steering wheel according to claim 3,
wherein the adjustment rod includes a locking groove which is formed on the outer peripheral surface of the portion close to one axial end of the adjustment rod, and the flange portion is provided as a snap ring which is locked in the locking groove.

5. The position adjustment device of the steering wheel according to claim 3,
wherein the flange portion has a non-circular shape.

6. The position adjustment device of the steering wheel according to claim 1,
wherein an external diameter of the one end portion of the adjustment rod in the axial direction is greater than an external diameter of the other end portion of the adjustment rod in the axial direction.

* * * * *